United States Patent [19]

Herman et al.

[11] Patent Number: 4,580,802
[45] Date of Patent: Apr. 8, 1986

[54] RIDING TOY WITH INDEPENDENT FRONT AND REAR STEERING

[75] Inventors: Harvey Herman; Charles Rosner, both of New York, N.Y.

[73] Assignee: Herman and Rosner Enterprises, Inc., New York, N.Y.

[21] Appl. No.: 575,628

[22] Filed: Jan. 31, 1984

[51] Int. Cl.[4] ............................................. B62K 21/10
[52] U.S. Cl. ................................. 280/267; 280/263; 280/268
[58] Field of Search ............... 280/263, 267, 268, 269, 280/7.14, 202; D21/80, 112; 180/236

[56] References Cited

U.S. PATENT DOCUMENTS

| 251,264 | 3/1979 | Cook et al. | D12/112 |
|---|---|---|---|
| 253,832 | 1/1980 | Cook et al. | D21/80 |
| 390,904 | 9/1975 | Black | 280/269 |
| 1,599,223 | 9/1926 | Epps | 280/269 |
| 2,207,161 | 8/1940 | Roe | 280/269 |
| 2,764,423 | 5/1964 | Gaddie | 280/269 |
| 2,812,194 | 11/1984 | Ajero | 280/263 |
| 2,995,384 | 3/1959 | Rich | 280/269 |
| 3,062,559 | 11/1982 | Hewitt | 280/202 |
| 3,311,388 | 4/1965 | Ryan et al. | 280/269 |
| 3,669,468 | 6/1972 | Rich | 280/267 |
| 3,801,130 | 4/1974 | Belden | 280/268 |
| 3,913,929 | 10/1975 | Matsuura | 280/7.14 |
| 4,103,921 | 8/1978 | Brooks et al. | 280/267 |
| 4,198,072 | 4/1980 | Hopkins | 280/267 |
| 4,279,429 | 8/1981 | Hopkins et al. | 280/267 |

OTHER PUBLICATIONS

Pictures of the basic design from which the inventor designed the claimed ornamental design for a riding toy.

Primary Examiner—David M. Mitchell
Assistant Examiner—Donn McGiehan
Attorney, Agent, or Firm—Blum Kaplan Friedman Silberman & Beran

[57] ABSTRACT

A three wheeled vehicle with an elongated body and independent front and rear steering is provided. The vehicle is preferably a pedal driven three wheeled vehicle. The rear wheels are mounted on a rear wheel assembly which is pivotably mounted on the body and displaced by a control lever mounted on one side of the body.

4 Claims, 14 Drawing Figures

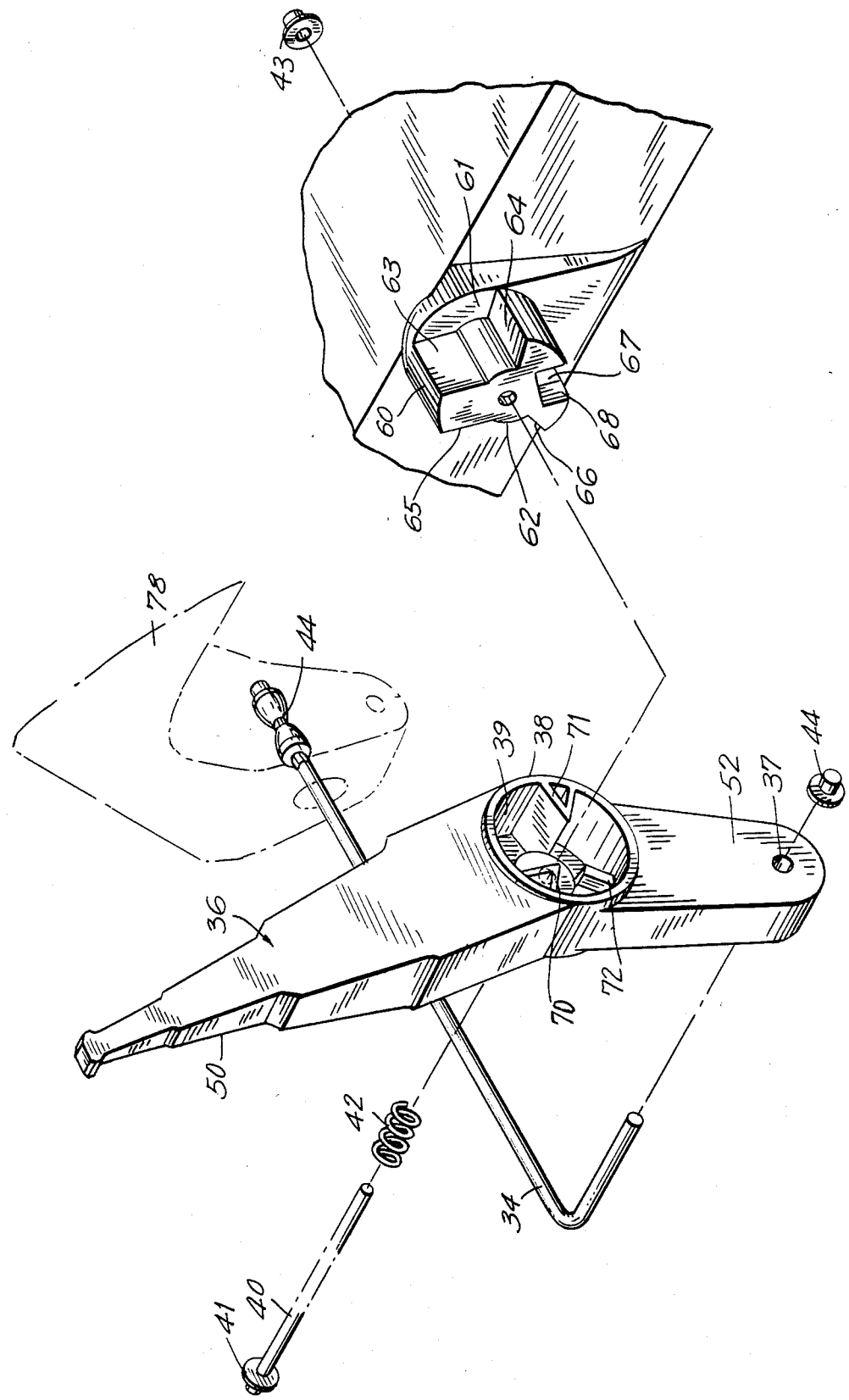

RIDING TOY WITH INDEPENDENT FRONT AND REAR STEERING

BACKGROUND OF THE INVENTION

The present invention is generally directed to three wheeled pedal powered vehicles adapted for use by small children and, in particular to a three wheeled pedal powered vehicle with independent front and rear steering.

The prior art has proposed three distinct classes of three wheeled vehicles. There are front steering, rear steering and synchronous front and rear steering three wheel vehicles. The earliest three wheeled toy vehicles were front wheel steering in nature and were unable to execute short radius turns, a problem common to all front steered vehicles.

To overcome the disadvantages of the front steered three wheeled vehicles, the prior art developed rear wheel steering devices. These vehicles have a front wheel fixed in a forward direction which is used solely for pedalling and a mechanism for steering the two rear wheels. These back steered three wheeled toy vehicles, while an improvement over the earlier front steered vehicles in terms of handling were still not as maneuverable as hoped. In addition, at high speeds, sharp turns tended to capsize the three wheeled toys because of the fixed front wheels.

A third type of three wheeled vehicle is the synchronized front and rear wheel steering wheeled vehicle. This type of three wheeled vehicle attempts to give the rider greater control and more maneuverability. However, the rider is unable to separately control the front and rear wheels in these three wheeled vehicles.

Although three wheeled vehicles of the above noted types have been used, it is noted that there is a need for a three wheeled vehicle with independent front and rear steering. For a three wheeled to be "crabbed" (to be propelled essentially sideways) it is necessary for the front wheel to be turned in one direction while the rear wheels to be turned in the opposite direction. In addition, when a particularly sharp turn is required, both front and rear steering provides a turn of narrower radius than with either a steerable front wheel or a steerable rear wheel. Accordingly, a three wheel vehicle having independent front and rear wheel steering is desired.

SUMMARY OF THE INVENTION

Generally speaking, in accordance with the instant invention, a three wheeled vehicle with independent front and rear wheel steering is provided. The three wheeled vehicle includes an elongated body unit having a front and rear end. The vehicle has a propelling member to propel the vehicle over a surface located at the front end of the elongated body unit and has a front steering mechanism and a rear steering mechanism. The front and rear steering mechanisms are independent of one another and are separately controlled.

In a preferred embodiment, a three wheeled vehicle has pedals on the front wheel to propel the vehicle over a surface. There is a steering wheel and steering column on the front end of the body unit which allows the front wheel to be turned. In addition, the two rear wheels are rotatably mounted to the rear end of the body unit so as to allow rotation about a vertical axis. The rotation of the rear wheels about the vertical axis is controlled by the use of a lever coupled to the rear wheel assembly. When the lever is pushed forward the axle connecting the rear wheels rotates in one direction. When the lever is pushed rearwardly the axle connecting the rear wheels rotates in the other direction. The lever is biased so as to remain in a central position which corresponds to the rear wheels facing forward.

The vehicle is operated by a person sitting on the body unit and pedalling the pedals on the front wheel. Steering is accomplished by handlebars to steer the front wheel and a lever to steer the rear wheels.

Accordingly, it is an object of the present invention to provide an improved three wheeled vehicle.

Another object of the present invention is to provide a pedal driven three wheeled vehicle with independent front and rear wheel steering.

Still another object of the present invention is to provide a three wheeled pedal powered vehicle with improved handling characteristics.

Yet another object of the present invention is to provide a pedal powered three wheeled vehicle which can make very small radius turns.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 13 is an exploded view of the rear wheel steering mechanism of the vehicle of FIG. 1.

DETAILED DESCRIPTION OF THE PREFERRED EMBODIMENTS

Figure 1:
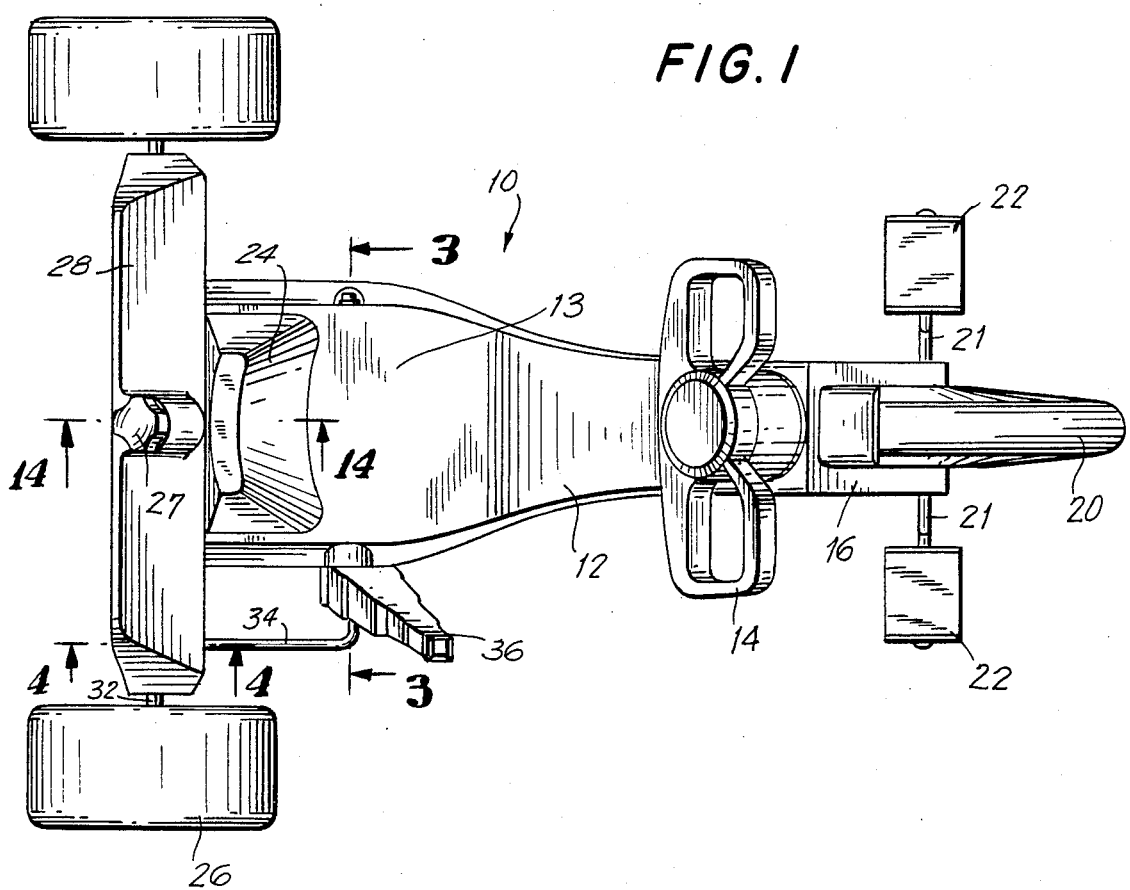
FIG. 1 is a top plan view of a three wheeled vehicle with independent front and rear wheel steering constructed in accordance with a preferred embodiment of the present invention.
Figure 2:
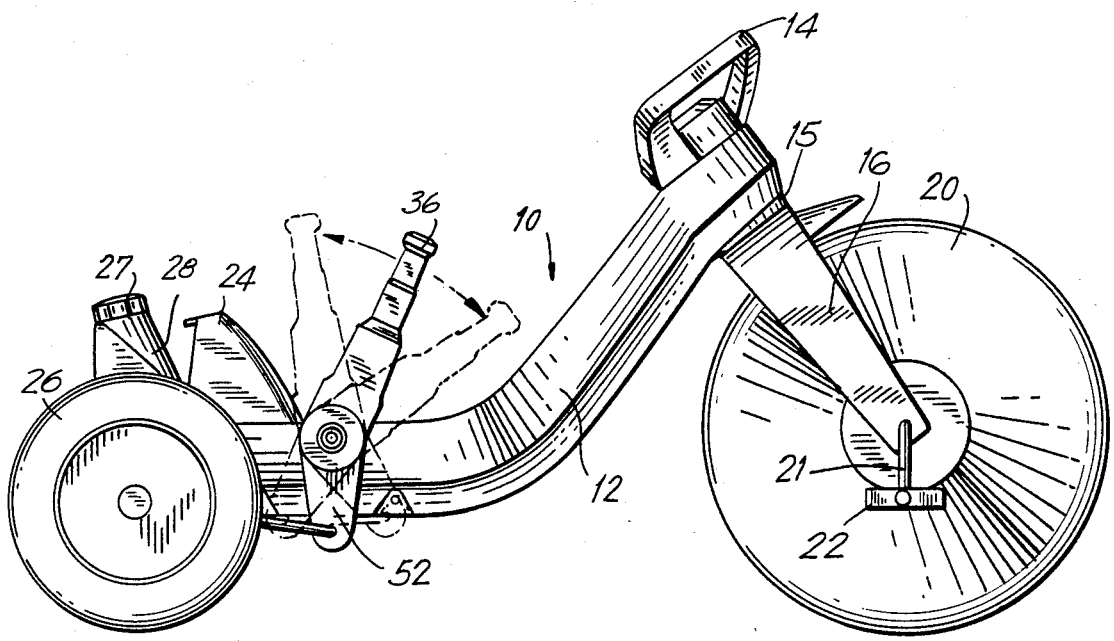
FIG. 2 is a side elevational view of a three wheeled pedal driven vehicle constructed in accordance with a preferred embodiment of the present invention showing the range of motion of the rear wheel steering controller.
Figure 14:
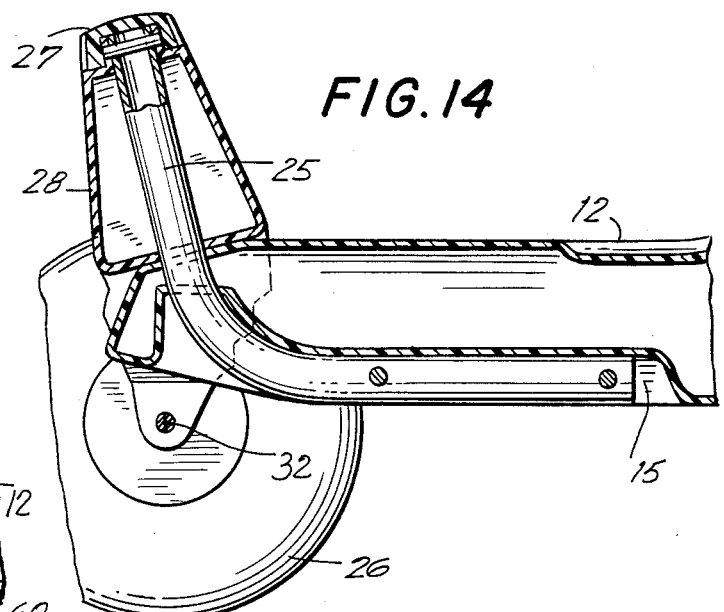
FIG. 14 is a cross-sectional view taken along line 14—14 of FIG. 1.

Reference is first made to FIGS. 1, 2 and 14 wherein a three wheeled pedal powered vehicle with independent front and rear wheel steering, generally indicated as 10, and constructed in accordance with the present invention is depicted. Vehicle 10 includes an elongated body 12 having a region 13 on which the user can sit and operate the vehicle. A bifurcated fork 16 is rotatably coupled to the front end of elongated body 12 through cylindrical opening 15 in elongated body 12. A front wheel 20 is rotatably mounted in fork 16 by means of pedal crank 21, which supports two pedals 22 for driving the vehicle in a conventional manner. A steering wheel 14 is mounted at the top end of fork 16 to permit the user to turn fork 16 and front wheel 20 as a unit to effect partial steering of the vehicle while the user pedals the vehicle. Seat back 24 is coupled to elongated body 12 towards the rear end of body 12 to support the back of the user seated on region 13. Rear wheels 26 are rotatably mounted on rear axle 32, which is journaled through and supported by rear wheel assembly 28. Rear wheel assembly 28 is rotatably connected to body 12 by L-shaped cylindrical connector 25. One arm of cylindrical connector 25 is substantially vertically oriented so as to allow the pivoting about the axis defined by cylindrical connector 25 and rear wheel assembly 28 to which rear wheels 26 and rear axle 32 are coupled. The other arm of connector 25 extends beneath body 12 in a channel 15. A cap 27 is provided on the top end of connector 25 to protect the user from the metal end of the connector and secure connector 25 in place.

Reference is next made to FIGS. 2 and 13 wherein the rear wheel steering mechanism is depicted. The rear wheel steering mechanism is composed of a body plug 60 projecting from the side of body 12, a control lever 36 and a control rod 34. Control lever 36 is formed with a central hub 38 defining a recessed area 39 which receives body plug 60. Control lever 36 has an upper lever arm 50 shaped as a grip for displacement by the user, and a lower lever arm 52. The control lever is pivotably mounted to body 12 by a retaining rod 40 having an end cap 41, 43 at each end to retain the rod and control lever in position. A coil spring 42 is positioned around rod 40 between end cap 43 and control lever 36 to bias the control lever inwardly against body plug 60. Central hub 38 is formed with an outer central recess 41 within which spring 42 is received.

Control rod 34 is L-shaped, with the shorter arm extending through holes 39 in lower lever arm 52 and retained therein by end cap 44. A bore 45 extends through a lower region of rear wheel assembly 28 adjacent one of rear wheels 26, the bore being formed with a constricted region 46 through which the longer arm of control rod 34 extends. A pair of spacers 47 are mounted on the longer arm of control rod 34 on either side of the constricted region 46, retained in position by flats 48 and end cap 49. This arrangement permits the pivoting of control rod 34 in bore 45 about the axis defined by constricted region 46, as the control rod 34 is displaced by lever arm 36 to pivot rear wheel assembly 28.

Body plug 60 is formed with a pair of cut out regions 61 and 62. Cut out region 61 is defined by end walls 63 and 64, while cut out region 62 is defined by end walls 65 and 66. Body plug 60 is further formed with a camming notch 67 intermediate said cut out regions including inclined walls 68 and 69. Central hub 38 is formed with a pair of triangular projections 70 and 71 extending into recessed area 39, projections 70 and 71 being positioned in cut out regions 61 and 62, respectively, when the central lever 36 is mounted on body plug 60. A camming member 72 also extends into recessed area 39 in registration with camming notch 67. Camming member 72 is formed with inclined surfaces 73 and 74 dimensioned to mate with inclined walls 68 and 69 of camming notch 38.

Figure 5:
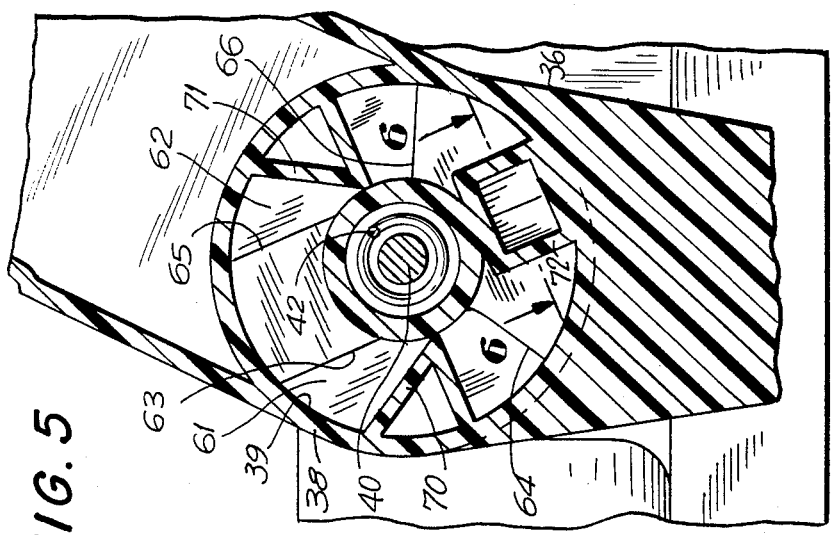
FIG. 5 is a fragmentary cross-sectional view taken along line 5—5 of FIG. 3.
Figure 6:
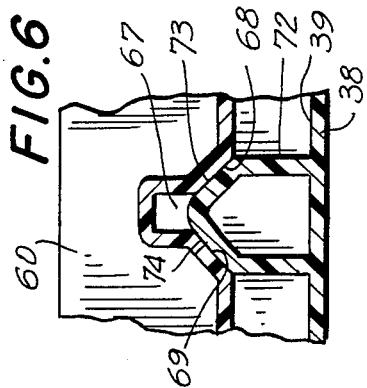
FIG. 6 is a fragmentary cross-sectional view taken generally along line 6—6 of FIG. 5.
Figure 3:
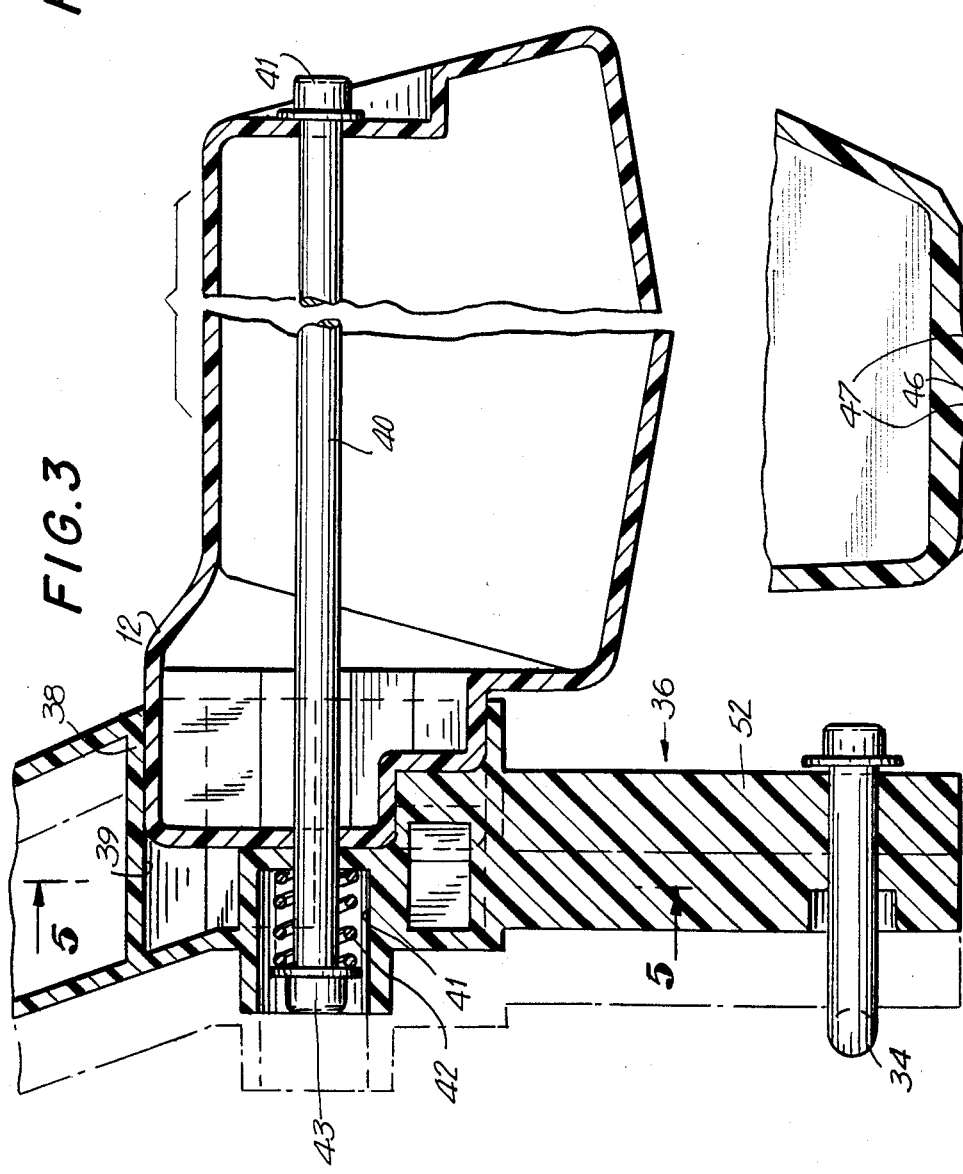
FIG. 3 is an enlarged fragmentary cross-sectional view taken along line 3—3 of FIG. 1.
Figure 4:
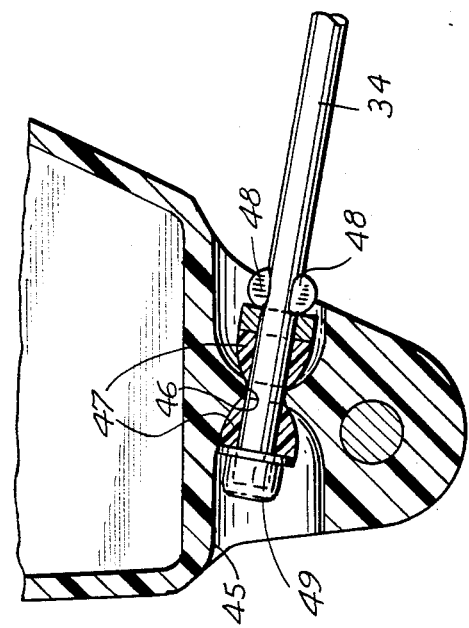
FIG. 4 is an enlarged fragmentary cross-sectional view taken along line 4—4 of FIG. 1.

A user sitting on body 12 with his or her lower back against seat back 24 operates pedals 22 with his or her feet to make the vehicle move forward or backward depending on the direction the pedals are rotated. The rider has two types of steering control. Front wheel 20 can be turned by rotating steering wheel 14. In addition the rider has control over rear wheels 26. Control lever 36, which is coupled to rear wheel assembly 28, rear wheels 26 and axle 32 by control rod 34, controls the positioning of the rear wheels. Control lever 36 is normally positioned in a central position so as to keep rear wheels 26 pointing forward, the position illustrated in FIGS. 3, 5 and 6. In this position camming member 72 is positioned in camming notch 67 and control lever 36 is biased to the position shown in solid lines in FIG. 3 by spring 42. However, control lever 36 can be pivoted by displacing upper lever arm 50 forward or backward, which causes rear wheels 26 to rotate either clockwise or counterclockwise about the axis defined by connector 25.

Figure 7:
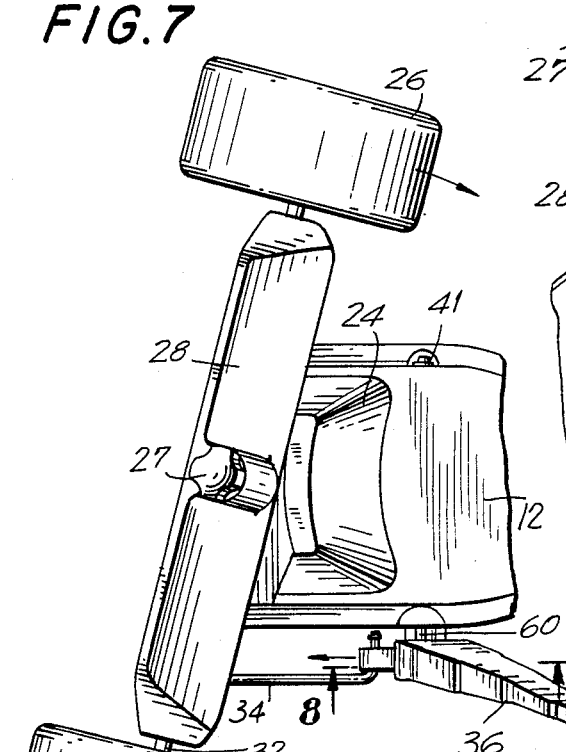
FIG. 7 is a partial top plan view of the three wheeled vehicle of FIG. 1 with the rear wheel axis rotated in a clockwise direction.
Figure 8:
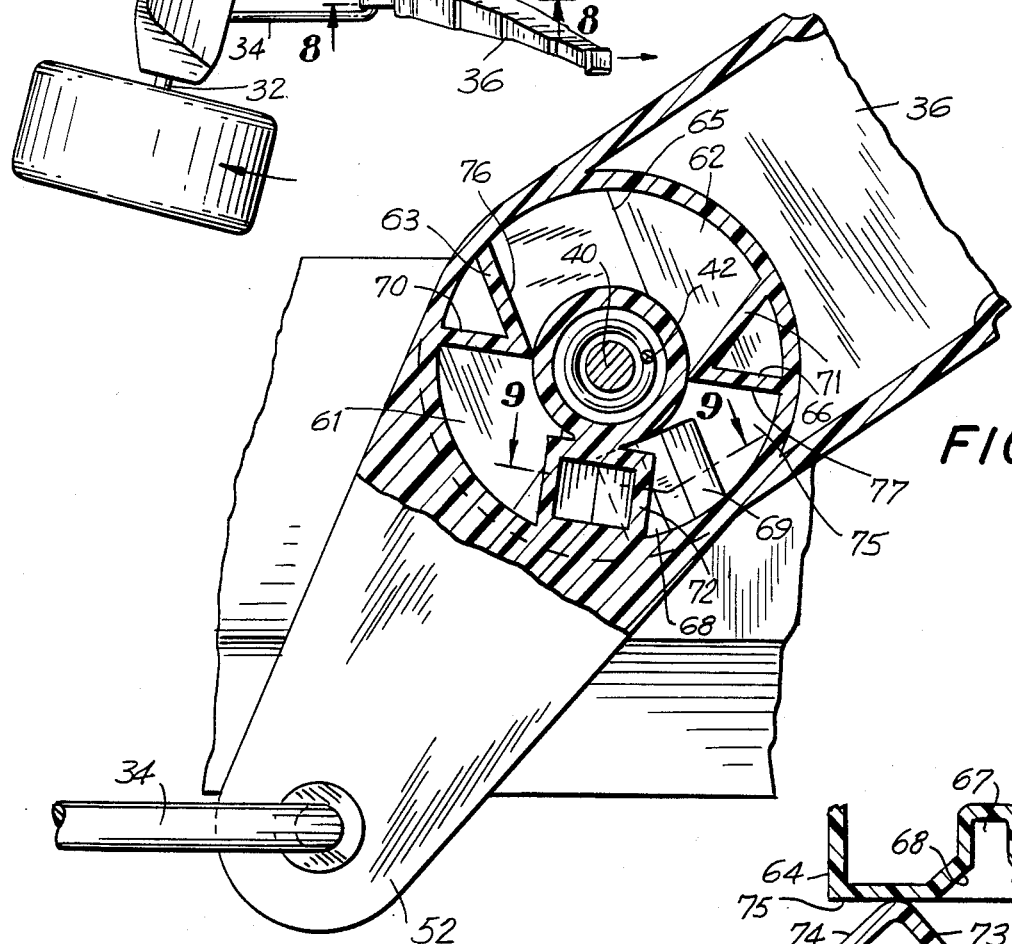
FIG. 8 is an enlarged fragmentary cross-sectional view taken along line 8—8 of FIG. 7.
Figure 9:
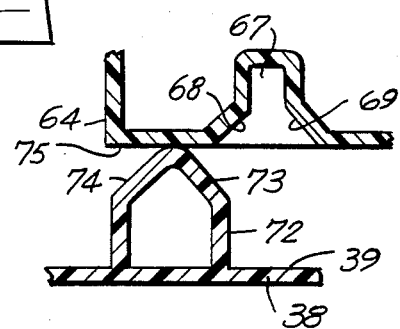
FIG. 9 is a fragmentary cross-sectional view taken along line 9—9 of FIG. 8.

Reference is next made to FIGS. 7, 8 and 9 wherein control lever 36 is pivoted by displacing upper lever arm 50 forward. This has the effect of displacing camming member 72 out of camming notch 67 so that the end of the camming member rests on end surface 75 of body plug 60 (FIG. 9), and urging control lever 36 away from body 12 to the position shown in phantom in FIG. 3. Displacement is limited by the engagement of wall 76 of triangular projection 70 against end wall 63 of cut out region 61, and the engagement of wall 77 of triangular projection 71 against end wall 66 of cut out region 62. Further, control rod 34 is pushed towards the rear of the vehicle causing rear wheel assembly 28 to rotate in a clockwise manner. Since rear wheels 26 are coupled to rear wheel assembly 28, rear wheels 26 also rotate in a clockwise manner. If vehicle 10 is propelled forward with rear wheels 26 in this position a left turn will be executed. If vehicle 10 is propelled backwards the rear of the vehicle will veer to the left. When control lever 36 is moved forward as described the rider may still independently steer handlebars 14 to alter the direction of front wheel 20. If front wheel 20 is turned to the left the vehicle will make a small radius left hand turn. If, however, steering wheel 14 is turned to the right, rear wheels 26 will "crab". This "crabbing" effect is a much desired effect in the toy market, greatly enhancing the play value of the toy.

Figure 10:
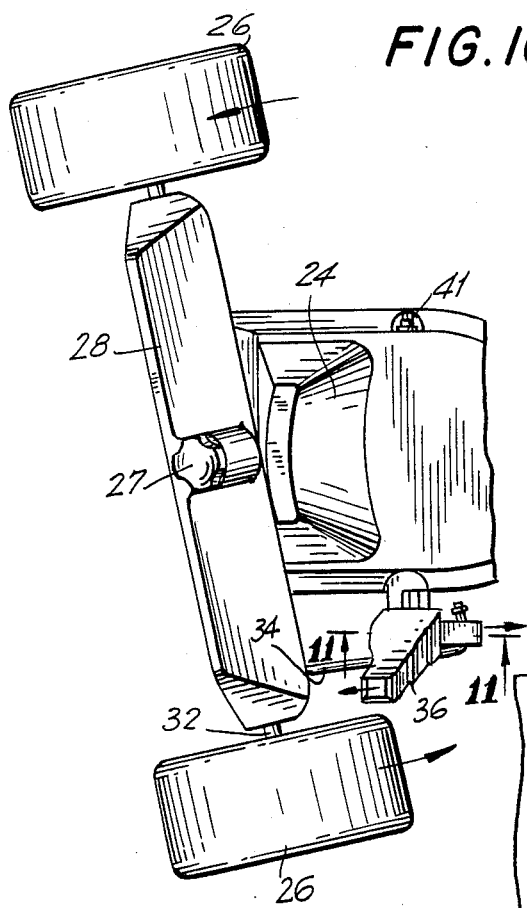
FIG. 10 is a partial top plan view of the three wheeled vehicle of FIG. 1 with the rear wheel axis rotated in a counterclockwise direction.
Figure 11:
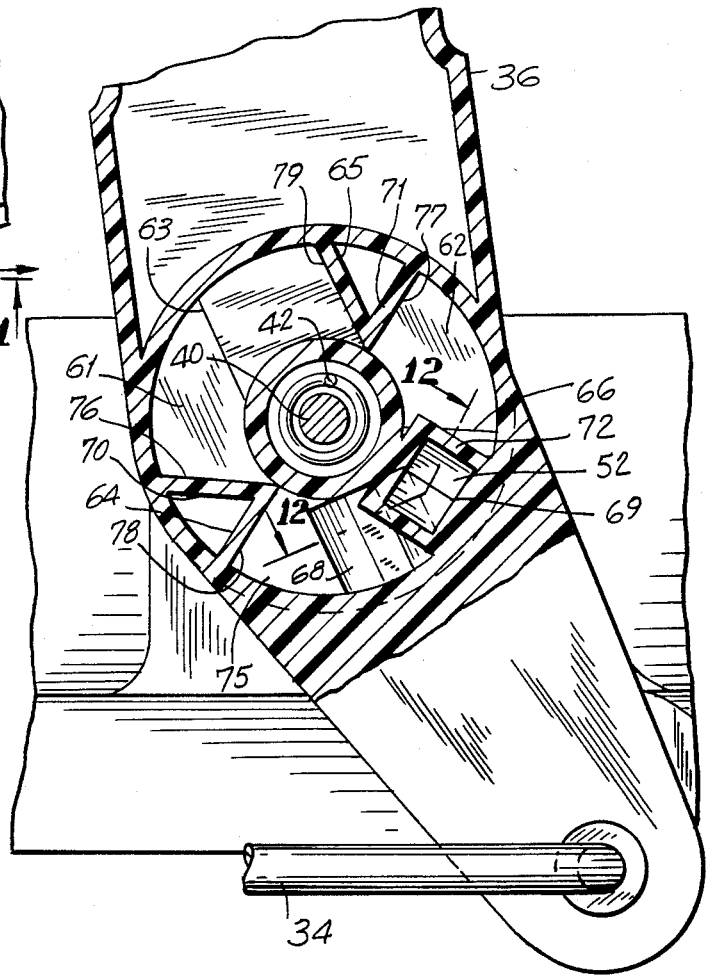
FIG. 11 is an enlarged fragmentary cross-sectional view taken along line 11—11 of FIG. 10.
Figure 12:
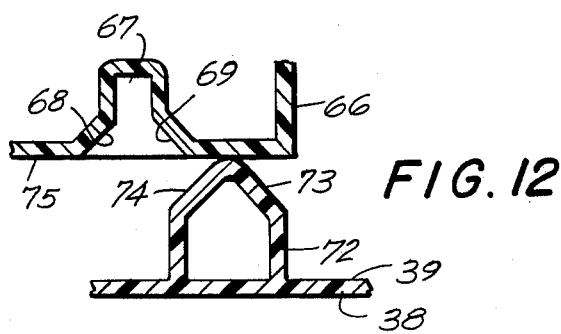
FIG. 12 is a fragmentary cross-sectional view taken generally along line 12—12 of FIG. 12.

Reference is next made to FIGS. 10, 11 and 12 wherein control lever 36 pivoted by pulling upper lever arm 50 towards the back of vehicle 10 is depicted. This has the effect of displacing camming member 72 out of camming notch 67 so that the end of camming member 72 rests on end surface 75 of body plug 60 (FIG. 12), and of moving control lever 36 outward from body unit 12 to the position shown in phantom in FIG. 3. Control rod 34 is pulled forward, causing the right side of rear wheel assembly 28 to move forward. This movement causes the counterclockwise rotation of rear wheel assembly 28 and particularly rear wheels 26. Displacement in this direction is limited by the engagement of wall 78 of triangular projection 70 against end wall 64 of cut out region 61, and the engagement of wall 79 of triangular projection 71 against end wall 66 of cut out region 62. As a result, vehicle 10 will make a right turn if being propelled forward. If being propelled backward the rear of the vehicle will veer to the right. If in addition to rear wheels 26 being so aligned steering wheel 14 is rotated to the right, causing front wheel 20 to rotate to the right, vehicle 10 will make a short radius right hand turn. If, however, steering wheel 14 is turned to the left, vehicle 10 will go to the left with rear wheels 26 "crabbing".

In practice, steering wheel 14 is used for routine steering. Rear steering is used to execute extremely tight turns and to "crab" the rear of vehicle 10.

In addition, the vehicle can have two front wheels instead of one.

Accordingly, the present invention provides a three wheeled powered vehicle with independent front and rear wheel steering which allows for improved handling and performance and enhanced play value.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A toy riding vehicle, comprising:
   an elongated body unit having a front and rear end;
   front steering means for steering the body unit over a surface during propulsion and coupled to said body unit, said front steering means including a single front wheel and means rotatably mounted at the front end of said body unit and rotatably supporting said front wheel at least in part below said body unit for riding on the surface, displacement of the rotating means and front wheel as a unit effecting front steering;
   rear steering means for steering the body unit over the surface during propulsion independent of said front steering means and coupled to said body unit, the rear steering means including two rear wheels, a rear wheel assembly means rotatably supporting said rear wheels and pivotably mounted on said body unit, a control lever pivotably mounted on one side of said body unit for manual displacement and a control rod coupled between said control lever and rear wheel assembly for pivoting said rear wheel assembly in response to the pivoting of said control lever to effect rear steering; and
   propelling means propelling the vehicle over the surface and coupled to said front steering means.

2. A toy riding vehicle as claimed in claim 1, wherein the rotating means includes a steering handle projecting above said body unit for manual displacement by a user seated on said body unit.

3. A toy riding vehicle as claimed in claim 1, wherein said propelling means includes a pedal crank coupled to said front wheel and pedals mounted on said pedal crank for engagement by the feet of a user.

4. A toy riding vehicle as claimed in claim 1, including means for limiting the pivotable displacement of said rear wheel assembly.

* * * * *